T. C. PEREBOOM.
WATERING TROUGH.
APPLICATION FILED SEPT. 4, 1909.
958,528.
Patented May 17, 1910.
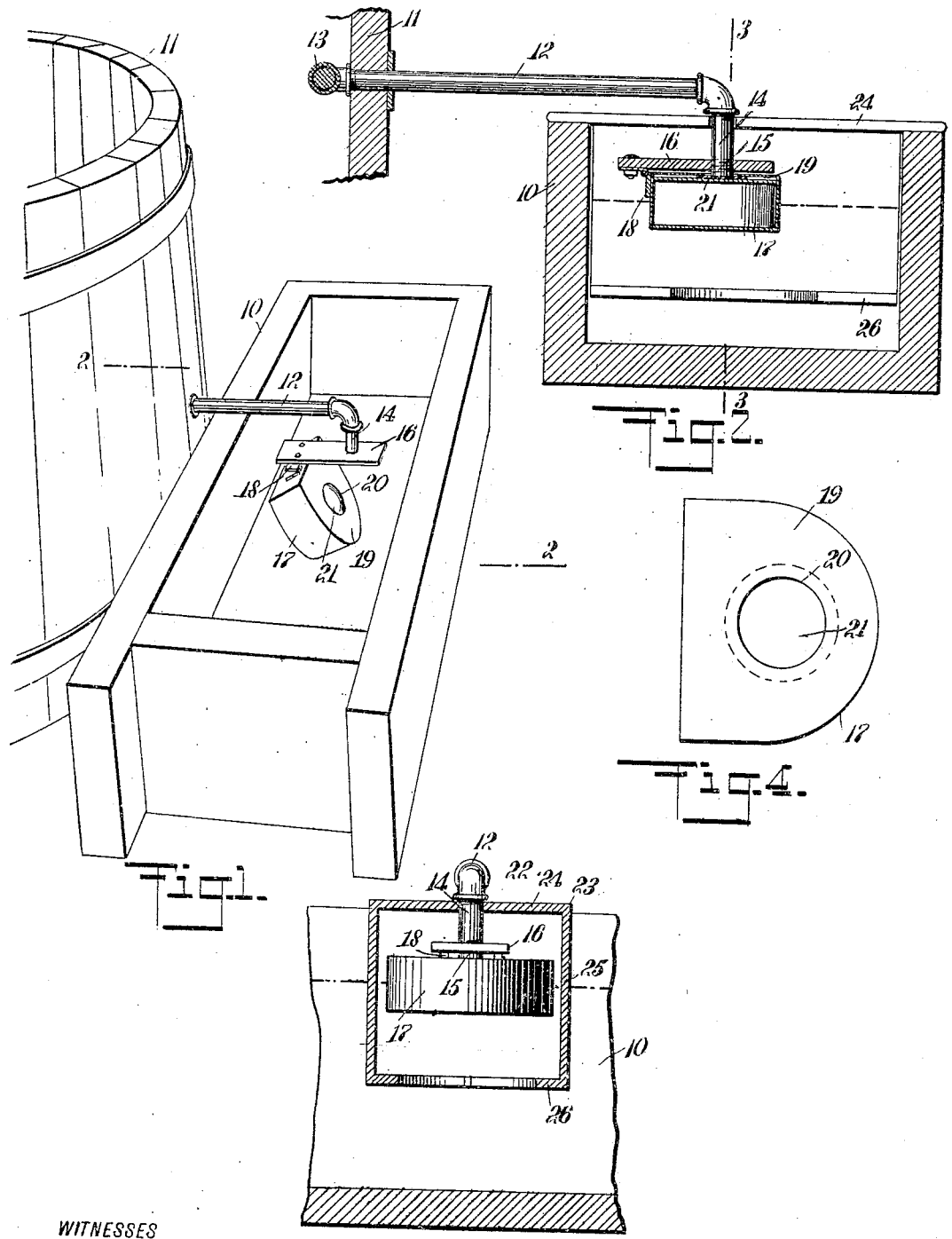

UNITED STATES PATENT OFFICE.

THEODORE CHRIS PEREBOOM, OF IRETON, IOWA.

WATERING-TROUGH.

958,528.  Specification of Letters Patent.  Patented May 17, 1910.

Application filed September 4, 1909. Serial No. 516,186.

*To all whom it may concern:*

Be it known that I, THEODORE C. PEREBOOM, a citizen of the United States, and a resident of Ireton, in the county of Sioux and State of Iowa, have invented a new and Improved Watering-Trough, of which the following is a full, clear, and exact description.

This invention relates to watering troughs for hogs, cattle and the like, and relates more particularly to a device of this class having an inlet pipe communicating with a tank or other suitable source of supply, and a float controlling the flow of water to the trough and having a hinged connection with said pipe.

The object of the invention is to provide a simple, strong and durable watering trough, in which the flow of water is automatically regulated, so that the water will not exceed a certain predetermined height in the trough, and in which the flow of the water is positively controlled by the action of the float.

The invention consists in the construction and combination of parts, to be more fully described hereinafter and particularly set forth in the claims.

Reference is to be had to the accompanying drawings forming part of this specification, in which similar characters of reference indicate corresponding parts in all the figures, and in which—

Figure 1 is a perspective view showing an embodiment of my invention; Fig. 2 is a transverse section on the line 2—2 of Fig. 1; Fig. 3 is a similar view on the line 3—3 of Fig. 2; and Fig. 4 is an enlarged plan view of the float.

Referring more particularly to the drawings, I provide a trough or watering receptacle 10, fashioned from wood or other suitable material, and having any form which adapts it for watering hogs, cattle or the like. A tank 11 or other suitable source of water supply is associated with the trough, and has secured thereto the inlet supply pipe 12 of the trough. The pipe 12 projects preferably into the tank and has a strainer 13 to prevent the entrance of material into the pipe which might tend to clog it. The pipe 12 has a downwardly disposed outlet end 14, the extremity 15 of which is threaded, and has mounted thereon, by means of a suitable threaded opening, a float carrier 16, consisting preferably of an elongated plate. The float 17 may be of any suitable form, but I prefer to have it of the shape shown most clearly in Fig. 4, and fashioned of metal. It is movably secured near one end of the carrier 16 by means of a hinge 18. The float has a double top 19, the upper wall of which has an opening 20 therethrough. A pad or disk 21 of rubber or the like is located between the walls of the double top and at the opening 20, so that when the float is in an elevated operative position, the pad is forced against the extremity 15 of the inlet pipe to seal the same.

I employ a guard casing 22, consisting of two members 23, each having a top 24, a side wall 25 and a bottom 26. The tops are extended to rest upon the sides of the trough to support the casing. The bottom portions 26 are cut away to permit the water to enter the casing freely.

I have found it of advantage to provide a hinged connection between the float and the float carrier, so that should the trough become empty the float cannot come to rest upon the bottom thereof; as the bottom of a trough is usually slimy or sticky it is possible that the float might stick to the bottom and thus remain inoperative even if water were again introduced into the trough.

Having thus described my invention, I claim as new and desire to secure by Letters Patent:

1. A watering trough having an inlet pipe, a member secured to said pipe, and a float hinged to said member and adapted to seal the end of said pipe, said float having under the top thereof a pad adapted to be engaged by said pipe.

2. A watering trough having an inlet pipe, and a float for controlling the flow of water into the trough and having a hinged connection with said pipe, said float having a double top, the upper wall whereof has an opening therethrough, said float having a pad between the walls of said double top at said opening.

In testimony whereof I have signed my name to this specification in the presence of two subscribing witnesses.

THEODORE CHRIS PEREBOOM

Witnesses:
 LEE REID,
 O. B. KESSEY